(12) United States Patent
Molnar

(10) Patent No.: US 7,035,359 B2
(45) Date of Patent: Apr. 25, 2006

(54) METHODS AND APPARATUS FOR DEMODULATION OF A SIGNAL IN A SIGNAL SLOT SUBJECT TO A DISCONTINUOUS INTERFERENCE SIGNAL

(75) Inventor: Karl James Molnar, Cary, NC (US)

(73) Assignee: Telefonaktiebolaget L.M. Ericsson, (SE)

( * ) Notice: Subject to any disclaimer, the term of this patent is extended or adjusted under 35 U.S.C. 154(b) by 821 days.

(21) Appl. No.: 09/975,636

(22) Filed: Oct. 11, 2001

(65) Prior Publication Data

US 2003/0072394 A1 Apr. 17, 2003

(51) Int. Cl.
*H03D 1/04* (2006.01)
*H04B 1/10* (2006.01)

(52) U.S. Cl. ..................................... 375/346
(58) Field of Classification Search ............... 375/283, 375/316, 340, 346, 347, 348, 349; 455/296
See application file for complete search history.

(56) References Cited

U.S. PATENT DOCUMENTS

| | | | |
|---|---|---|---|
| 5,335,250 A | 8/1994 | Dent et al. | 375/224 |
| 5,400,362 A | 3/1995 | Chennakeshu et al. | 375/285 |
| 5,909,465 A | 6/1999 | Bottomley et al. | 375/227 |
| 5,933,768 A * | 8/1999 | Skold et al. | 455/296 |
| 6,167,081 A | 12/2000 | Porter et al. | 375/232 |
| 6,320,919 B1 * | 11/2001 | Khayrallah et al. | 375/347 |
| 6,832,080 B1 * | 12/2004 | Arslan et al. | 455/296 |

FOREIGN PATENT DOCUMENTS

| | | |
|---|---|---|
| WO | 98/38750 | 9/1998 |
| WO | WO 00/33526 | 6/2000 |
| WO | 01/45289 | 6/2001 |
| WO | 02/23742 | 3/2002 |

OTHER PUBLICATIONS

International Search Report for PCT/SE02/01677.

(Continued)

*Primary Examiner*—Kevin Kim
(74) *Attorney, Agent, or Firm*—Myers Bigel Sibley & Sajovec

(57) ABSTRACT

Methods and systems are provided for processing a received signal including receiving the signal to provide a sequence of symbols associated with the received signal in respective ones of a plurality of symbol positions. A known block of the sequence of symbols containing known symbol values and an unknown block of the sequence of symbols containing unknown symbol values are identified. A desired demodulation type is determined for use in demodulating the unknown block based on the known symbol values. An interferer signal characteristic discontinuity location in the unknown block is detected. The unknown block is demodulated using a first selected demodulation type between the interferer signal characteristic discontinuity and the known block and a second selected demodulation type on another portion of the unknown block, the first selected demodulation type and the second selected demodulation type being selected based on the determined desired demodulation type for use in demodulating the unknown block and the detected interferer signal characteristic discontinuity.

38 Claims, 11 Drawing Sheets

OTHER PUBLICATIONS

Keerthi, Arvind V. and John J. Shynk, "Separation of Cochannel Signals in TDMA Mobile Radio", Oct. 1998, IEEE Transactions on Signal Processing, vol. 46, No. 10, pp. 2684-2697.

Chandrasekaran, Rajiv et al., "A constrained least-squares algorithm with data-adaptive beamforming and equalization for cochannel TDMA signals", Signal Processing 80 (2000), pp. 2033-2047.

European Search Report, dated Jul. 11, 2002.

* cited by examiner

METHODS AND APPARATUS FOR DEMODULATION OF A SIGNAL IN A SIGNAL SLOT SUBJECT TO A DISCONTINUOUS INTERFERENCE SIGNAL

BACKGROUND OF THE INVENTION

The present invention relates generally to digital communications, and, more particularly, to methods and systems for demodulating a received signal.

Various approaches have been developed for demodulating a received signal. For a conventional (single user) receiver it is known to use single or uni-directional demodulation. Bi-directional demodulation has also been proposed to improve performance using multiple known fields within the received signal as described in U.S. Pat. Nos. 5,335,250 and 5,400,362. Furthermore, as described in U.S. Pat. No. 5,909,465, the performance of the bi-directional demodulation can be enhanced by performing a first demodulation pass, calculating figure of merit (quality) values related to this demodulation, choosing demodulation directions for each sub-block of unknown data based upon these figures of merit, and then performing a second demodulation pass.

Joint demodulation or interference cancellation may be used as an alternative to single user demodulation to handle co-channel interference in communication systems, such as time division multiple access (TDMA) systems. Joint demodulation may be used to detect two or more signals that are received over a common channel. For example, joint demodulation may be used to detect a desired signal from a received signal that includes an interfering signal. In joint demodulation, the desired signal and the interfering signal are typically jointly demodulated based on information concerning the desired signal and the interfering signal, so as to obtain a better estimate of the desired signal.

Two-user joint demodulation for ANSI IS-136 TDMA mobile terminals has been proposed for cancellation of a dominant interfering signal under the assumptions of a flat, slow fading downlink channel environment. By subtracting off the interfering signal, the desired signal's bit error rate may be improved. This occurs where the channel and symbol data corresponding to the interfering signal are not correlated with the desired signal, thereby allowing separation of the two signals. Joint demodulation may, therefore, rely upon the ability to generate channel estimates and perform symbol detection for both the desired signal and the interfering signal. Detection of the desired signal may be improved, therefore, due to improved detection and cancellation of the interfering signal.

Interference cancellation may also be performed by spatial discrimination of the interferer relative to the desired signal if multiple receive antennas are available. However, for systems such as the TDMA IS-136 system, it has been proposed to allow downlink power control on a time-slot basis. This may impact interference cancellation approaches as the time-slots are not necessarily slot-aligned. Thus, the interferer power level may change, or even disappear, during the desired signal's slot. In general, interference cancellation approaches will have some loss, relative to the conventional demodulation approaches, when no interferer is present. Even more dramatic performance losses may occur when the interferer changes its power level abruptly, as different quantities (such as channel estimates or impairment covariance matrices) are typically used during demodulation of the slot. Even if these estimates are updated adaptively, the adaptation rate is typically not fast enough to withstand a sudden step change in the interferer characteristics.

SUMMARY OF THE INVENTION

Embodiments of the present invention include methods and systems for processing a received signal including receiving the signal to provide a sequence of symbols associated with the received signal in respective ones of a plurality of symbol positions. A known block of the sequence of symbols containing known symbol values and an unknown block of the sequence of symbols containing unknown symbol values are identified. A desired demodulation type is determined for use in demodulating the known block based on the known symbol values. An interferer signal characteristic discontinuity location in the unknown block is detected. The unknown block is demodulated using a first selected demodulation type between the interferer signal characteristic discontinuity and the known block and a second selected demodulation type on another portion of the unknown block, the first selected demodulation type and the second selected demodulation type being selected based on the determined desired demodulation type for use in demodulating the known block and the detected interferer signal characteristic discontinuity.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE INVENTION

Figure 1:
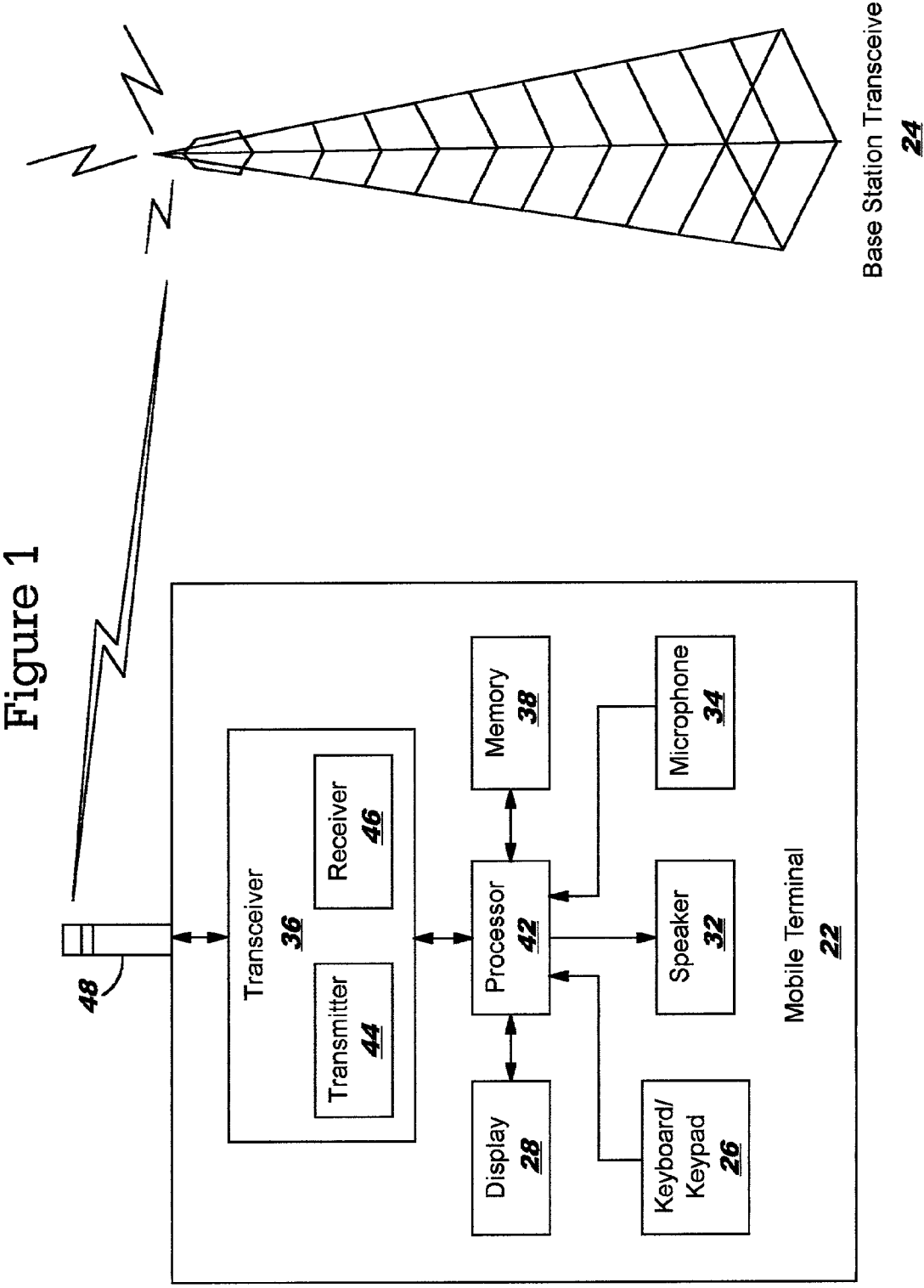
FIG. 1 is a schematic of an exemplary radiotelephone communication system including demodulation of a signal slot subject to a discontinuous interference signal in accordance with embodiments with the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods and/or systems. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Referring now to FIG. 1, an exemplary radiotelephone communication system, in accordance with embodiments of the present invention, includes a mobile terminal 22 and a base station transceiver 24. The mobile terminal 22 includes a keyboard/keypad 26, a display 28, a speaker 32, a microphone 34, a transceiver 36, and a memory 38 that communicate with a processor 42. The transceiver 36 typically comprises a transmitter circuit 44 and a receiver circuit 46, which respectively transmit outgoing radio frequency signals to the base station transceiver 24 and receive incoming radio frequency signals from the base station transceiver 24 via an antenna 48. The radio frequency signals transmitted between the mobile terminal 22 and the base station transceiver 24 may comprise both traffic and control signals (e.g., paging signals/messages for incoming calls), which are used to establish and maintain communication with another party or destination.

The foregoing components of the mobile terminal 22 may generally be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

The base station transceiver 24 contains the radio transceivers supporting an individual cell in a cellular network and communicate with the mobile terminal 22 and other mobile terminals in the cell using a radio-link protocol. Although only one base station transceiver 24 is shown, it will be understood that many base station transceivers may be connected through, for example, a mobile switching center and other devices to define a wireless communication network.

It will be understood that although the present invention may be embodied in communication apparatus, such as the mobile terminal 22 and/or the base station transceiver 24, the present invention is not limited to such apparatus and/or systems. For example, the present invention may be embodied in such apparatus as data processing systems, modems, and application specific integrated circuits (ASICS). Indeed, the present invention may be embodied in any method, communication apparatus, and/or computer program product that utilizes selectively more than one type of demodulation for a received signal.

The signal received by the mobile terminal 22 may include not only a desired signal from the base station transceiver 24 but also noise and one or more interference signals. The desired signal may further include fields including known symbols. Note that a symbol may contain binary information and, therefore, may be embodied as a single bit. It should be understood, however, that a symbol may be used to embody information comprising multiple bits through various encoding and/or modulation techniques.

The selection of non-interferer cancellation (single user) or interferer cancellation (joint) demodulation in various embodiments of the present invention may be based on a variety of criteria. Either single-user (conventional) demodulation or two-user (joint) demodulation may be selected, for example, based on one or more of the following factors: 1) the presence or absence of a single, dominant interfering signal; 2) the level of dispersion in the desired signal's channel; 3) the speed of a mobile terminal as represented by a Doppler spread value of the desired signal; and 4) the existence of minimal or no signal interference. Selective adaptation of a radio receiver to perform either single-user demodulation or two-user (joint) demodulation based on the foregoing factors is discussed in detail in U.S. patent application Ser. No. 09/660,050, entitled "Apparatus for and Method of Adapting a Radio Receiver Using Control Functions," filed Sep. 12, 2000, which is hereby incorporated herein by reference in its entirety.

Just as in the case where a deep fade can degrade performance when encountered while demodulating a user's slot, so can an abrupt change of interferer power affect a demodulation approach that estimates interferer quantities. As will be described herein, various embodiments of the present invention operate in such an environment by first determining, for all (or some) of the known fields, which demodulation type should be used. Also, if information about known fields for the interferer is available, or can be estimated, a determination of which demodulation type to be used may be made for these interferer locations. To do this, the following steps may generally be performed.

1. The quantities for determining whether to use a single-user demodulation approach or an approach that performs interference cancellation can be estimated at each known sequence of desired signal. These can include similar estimates as those described in U.S. patent application Ser. No. 09/464,830, entitled "Selective Joint Demodulation Systems and Methods for Receiving a Signal in the Presence of Noise and Interference," filed Dec. 19, 1999, which is hereby incorporated herein by reference in its entirety. Such estimates can include desired signal carrier power (C), noise power (N), carrier to interference plus noise ratio (C/(I+N)), interference to noise ratio (I/N) or other ratio calculated based on ones of C, N, I or received signal power. It can also include the noise covariance matrix across multiple antennas.

2. Decide, at each known signal field/block, which demodulation type, conventional (single user) or interference cancellation, to use for the adjacent unknown symbol field/block.

3. Detect the interferer slot boundary, and if it is detected, estimate its location and the location of any interferer known fields.

4. If any interferer known fields are located, estimate interferer quantities and again determine which demodulation type to be used based upon this additional information.

Once a determination is made regarding which demodulation type to use for each unknown field/block, the demodulation direction may be determined for each unknown field. Possible approaches for this include:

1. Use bi-directional demodulation over each unknown field/block, choosing the forward demodulation type from the decision at the left known field and the backward demodulation type from the decision at the right known field. The demodulation may proceed from each end until all of the data is demodulated. If there is a detected interferer boundary in the unknown field, demodulation from each side may proceed until this boundary is reached, otherwise each demodulation may proceed until they reach in the middle of the unknown field.

2. For unknown fields where the interferer boundary is detected, operations may proceed as above. For those unknown fields where no interferer slot boundary is detected, a decision may be made as to which known field has the better channel quality estimate. The demodulation then may start from this known field using the selected demodulation type.

However, as will be discussed below, there may only be one known field within the slot to be demodulated (as is typically the case for the IS-136 uplink). A multi-pass demodulation technique, such as discussed by Fulghum in U.S. patent application Ser. No. 09/201,623, may then be used. In this approach a first demodulation pass can be used together with channel decoding and subsequent re-encoding and re-modulation to identify known symbol locations within the desired signal slot. The sequences of these assumed known symbols can then be used in various embodiments of the present invention. In various embodiments, the following operations may be provided:

1. The interferer slot boundary may provide differentiation between where conventional demodulation and interference cancellation should be used, and the slot can be divided into two to use the desired demodulation on each side. The assumed known symbols may provide channel estimates for the unknown symbol locations of the desired signal using interpolation.

2. As the accuracy of the desired signal's channel estimate may be subject to the interference, it may be preferred to track the desired signal channel even though the known or pilot symbols are available. In this case, the slot can be subdivided into regions (or subfields), where each region may contain one or more pilot symbols. Each region may serve in a similar manner as a sequence of known symbols to be used in the bi-directional approach generally described above. The pilot symbols can be used to generate initial channel estimates for demodulating each region.

Various embodiments of the present invention will now be further described for the case where there is a discontinuous interferer located within the extent of the desired signal slot. However, the present invention may be applied where there are interferers with multiple discontinuities within an interferer slot and the present invention may be readily extended to cover these cases in light of the present disclosure.

Figure 2:
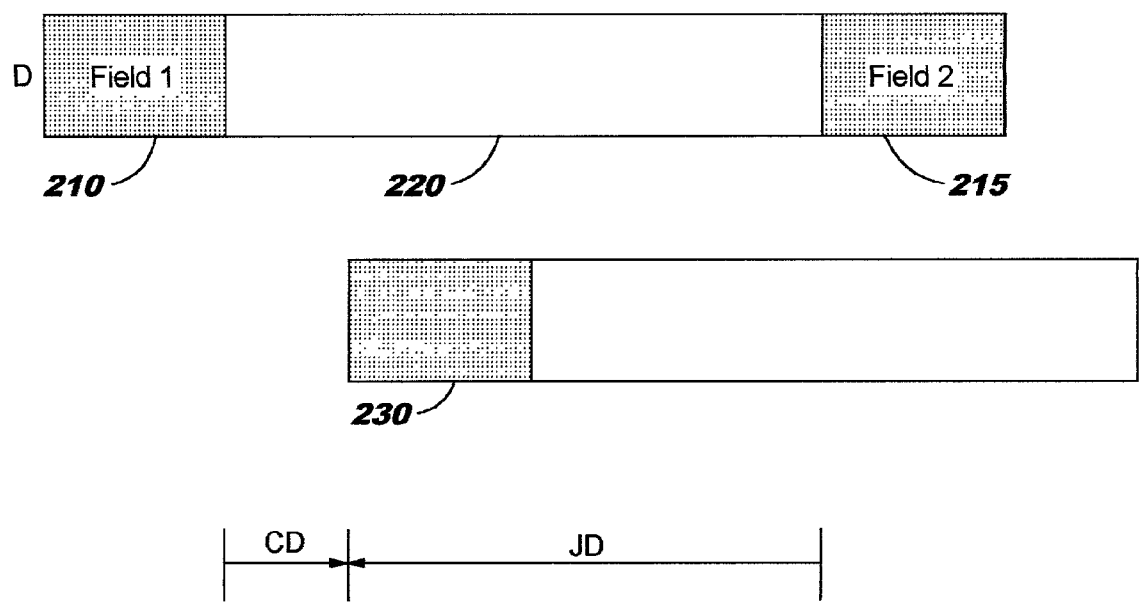
FIGS. 2–3 are schematic illustrations of desired (D) and interfering (I) signals which may be processed in accordance with embodiments of the present invention.

Referring now to FIG. 2, a received signal having two desired signal known fields/blocks 210, 215 and an unknown field/block 220 within the desired signal (D) is shown. This would be applicable, for example, to the IS-136 downlink when training sequences are available for the desired user's slot and the following user's slot. A slot misaligned interferer (I) signal 230 is also shown. The interferer slot boundary may be detected between the two known fields of the desired signal and, for example, conventional demodulation (CD) may be used starting from the left known field and joint demodulation (JD) may be used starting from the right known field. Operations related to determining the demodulation approach for various embodiments are further described with reference to the flowchart illustrations of FIGS. 6 and 8.

Figure 3:
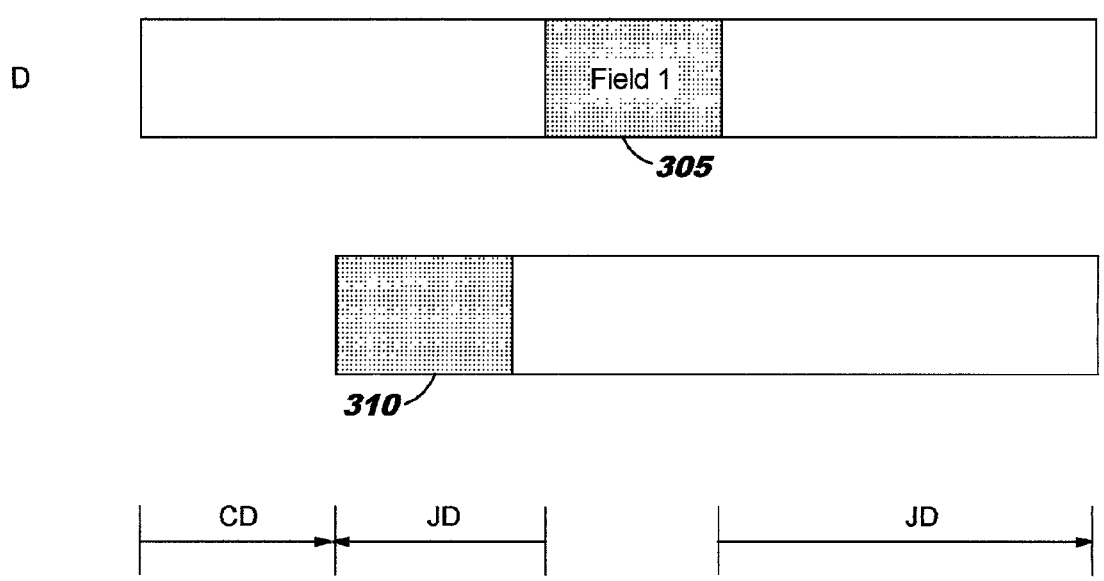

Referring now to FIG. 3, a received signal having a single desired signal known field/block 305 within the desired signal (D) is shown. This may occur in the case where there is only a single known field for the desired signal (such may be the case, for example, in the IS-136 uplink or for GSM systems). Alternatively, this may occur at the edges of the slot even if there are many known fields present. A slot misaligned interferer signal (I) 310 is also shown. For each unknown data field that is adjacent to only one known field of the desired signal, if an interferer boundary is detected over the unknown data, the demodulation type in use can be converted from one demodulation type to the other under consideration. For example, as shown in FIG. 3, joint demodulation (JD) is chosen over known Field 1 305. When demodulating to the left of this known field 305, an interferer boundary is detected and the demodulation type can be switched from joint demodulation to conventional single user demodulation (CD). Note, that there may be cases where there is a boundary between two adjacent interferer slots, but in the absence of having a known field/block to make a decision about which demodulation technique to use, the fallback may be to use conventional demodulation. Operations related to the environment shown in FIG. 3 are further described with reference to the flowchart illustrations of FIGS. 7 and 8.

Figure 4:
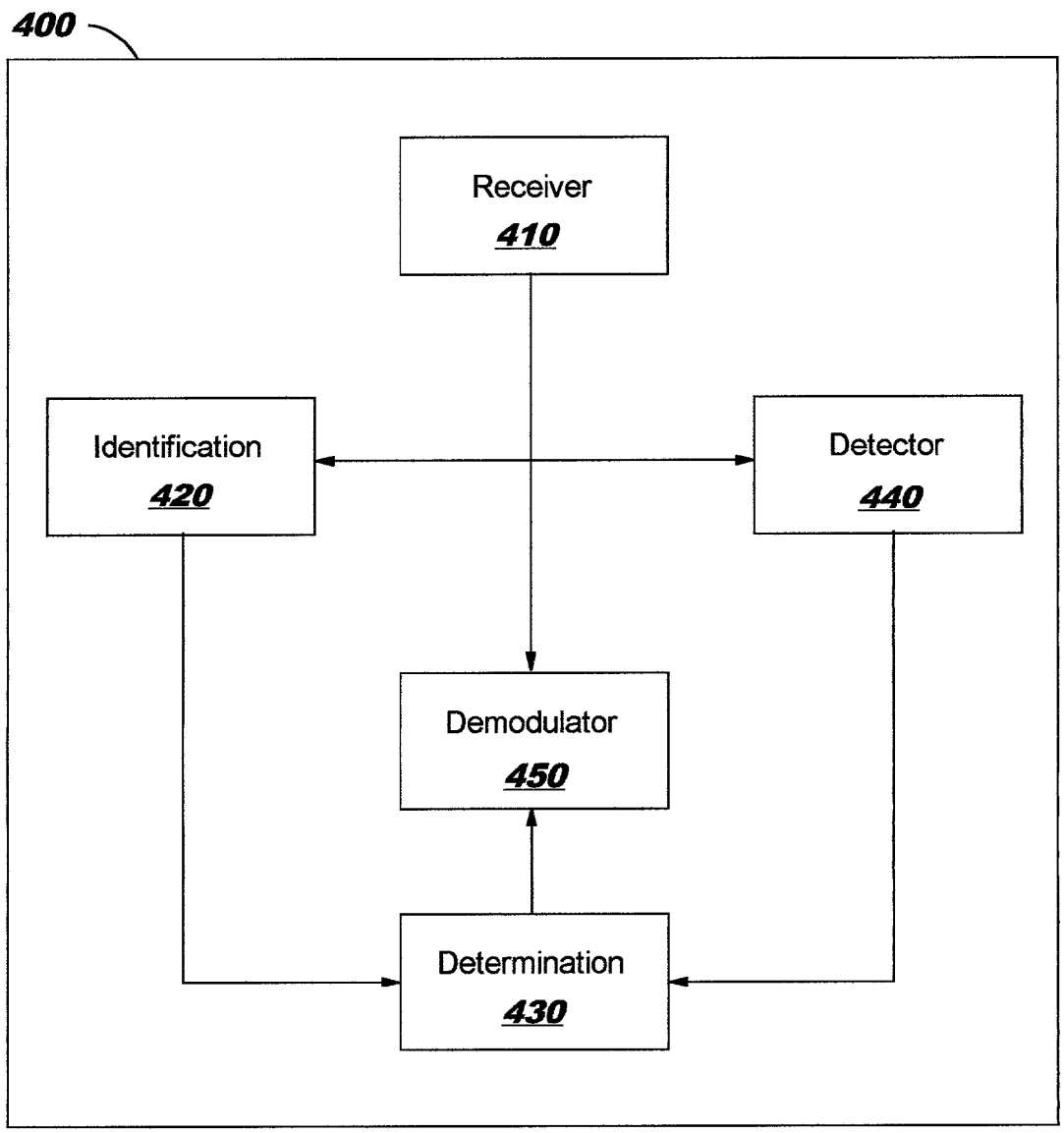
FIG. 4 is a block diagram of a receiver system in accordance with embodiments of the present invention.

FIG. 4 is a schematic block diagram illustrating receiver systems for processing a received signal in accordance with various embodiments of the present invention. As shown for the embodiments in FIG. 4, the system 400 includes a receiver 410 that receives the signal to provide a sequence of symbols associated with the received signal in respective ones of a plurality of symbol positions. It is to be understood that the receiver 410 may be part of a transceiver, such as the transceiver 36 of FIG. 1 coupled to the antenna 48. Thus, the system 400 may both receive and transmit the signals but, for the purposes of understanding the present invention, operations will be described with reference to receiving a signal in accordance with embodiments of the present invention.

Various circuits (or modules) of the illustrated embodiments of the present invention shown in FIG. 4 may be implemented, for example, by the processor 42 shown in FIG. 1 supported by use of the memory 38 also shown in FIG. 1. An identification circuit 420 identifies a known block of the sequence of symbols. The known block contains known symbol values. Examples of such known blocks include the fields 210, 215 shown in FIG. 2 and the field 305 shown in FIG. 3. The identification circuit 420 thereby further identifies an unknown block of the received sequence of symbols, where the unknown block contains unknown symbol values. As will be understood by those of skill in the art in light of this disclosure, the known symbol information may include pilot symbols or other known symbols at various locations in a received signal slot based on a priori information about the transmitted sequence of symbols, such as training information or known or predictable fields. As will be further described herein, the known symbols may also be generated by the receiving device using multi-pass demodulation where symbols are demodulated and error correction decoded and then reencoded and modulated.

The system 400 shown in FIG. 4 further includes a determination circuit 430 that determines a desired demodulation type for use in demodulating the unknown block (or blocks) based on the known symbol values. A detector circuit 440 detects an interferer signal characteristic discontinuity location in the unknown block. For example, such an interferer signal characteristic discontinuity may comprise an interferer signal slot misalignment relative to a slot alignment of a desired signal component of the received signal as shown by the respective timing of the desired (D) interferer (I) signals shown in FIGS. 2 and 3.

The system 400 further includes a demodulator circuit 450 that demodulates the unknown fields to provide symbol estimates for the received signal to the receiving system 400. The demodulator 450 demodulates the unknown block symbols using a first selected demodulation type between the interferer signal characteristic discontinuity and a known block and a second selected demodulation type on another portion of the unknown block. The first selected modulation type and the second selected modulation type in the illustrated embodiments are selected based on the determined desired modulation type for use in demodulating the unknown block (or blocks) and the detected interferer signal characteristic discontinuity location. Such operations are illustrated, for example, with respect to a single and two known fields by the selection of conventional demodulation (CD) or joint demodulation (JD) and respective directions for such demodulation (where bi-directional demodulation is desired) in FIGS. 2 and 3.

Operations for further embodiments of the present invention utilizing multi-pass demodulation will now be described with reference to the schematic block diagram illustration of FIG. 5. It is to be understood that the demodulator 450 may be a multi-pass demodulator and that aspects of multi-pass demodulation may be utilized with the embodiments described in reference to FIG. 4 as well as to those in reference to FIG. 5. It will further be understood from the description which follows that an environment including slot misaligned interferer signals may be addressed by the slot partition approach which will be described herein with reference to FIG. 5 and various of the flowcharts, either alone or in combination with the selection of a type and direction of demodulation within an unknown field based on a detected interferer discontinuity location as described previously.

Figure 5:
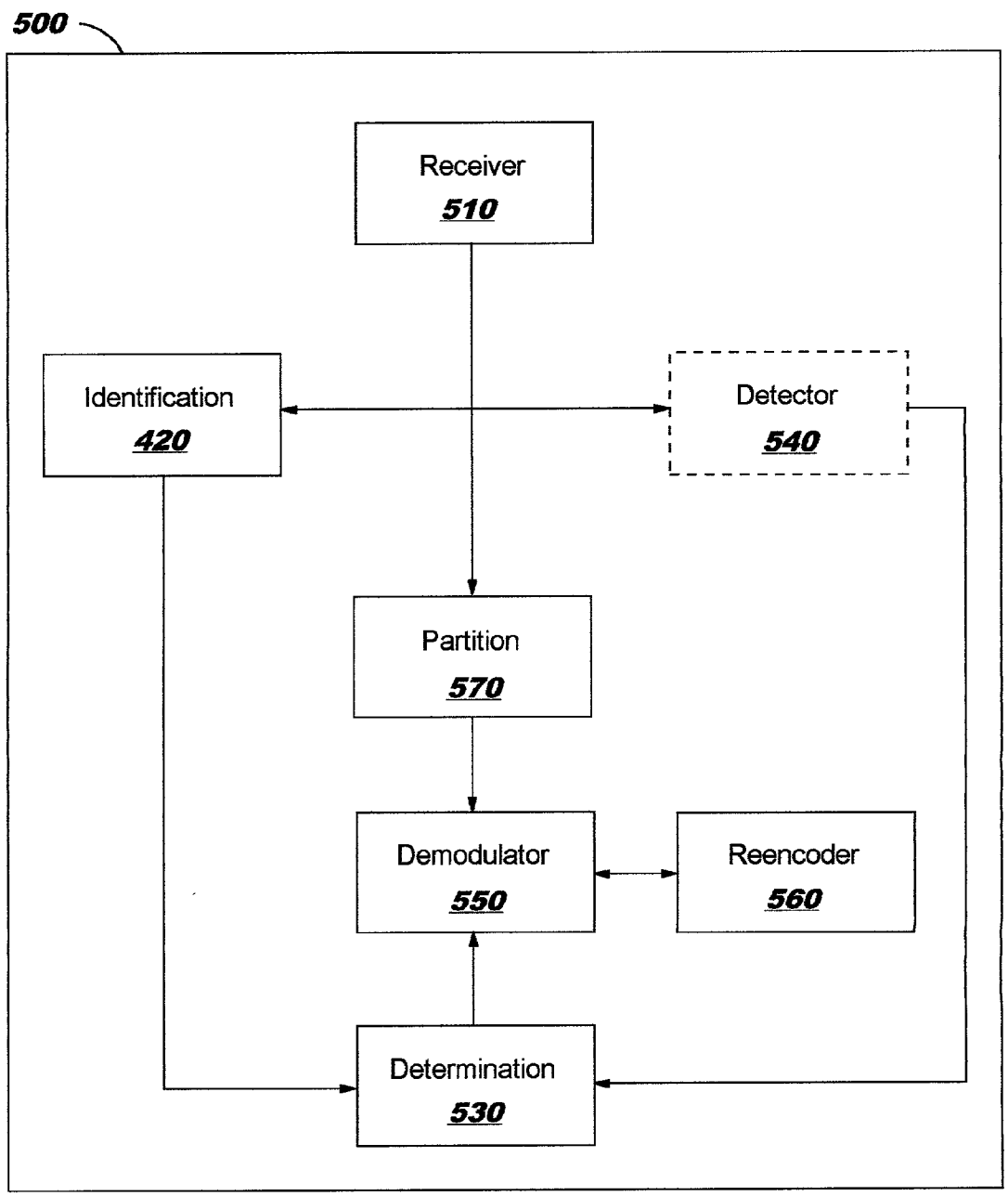
FIG. 5 is a block diagram of a receiver system in accordance with further embodiments of the present invention.

As shown in FIG. 5, the system 500 for processing a received signal in the illustrated embodiments includes a receiver 510 that receives the signal to provide a sequence of symbols associated with the received signal in respective ones of a plurality of symbol positions. As with the receiver 410 of FIG. 4, the receiver 510 may be a transceiver, such as the transceiver 36 coupled to the antenna 48 as illustrated in FIG. 1. A multi-pass demodulator 550 is provided which includes a first pass demodulator/decoder that first pass demodulates and decodes the sequence of symbols to provide error corrected decoded bits. The demodulator 550 further operates as a second pass demodulator that demodulates sub fields of the received symbols using determined desired demodulation types as will be further described herein. While shown as implemented in a single demodulator 550, it is to be understood that the first pass demodulator and second pass demodulator may be separate circuits or modules.

A reencoder circuit 560 re-encodes and modulates the error corrected decoded bits from the first pass module of the demodulator 550 to provide a second sequence of symbols associated with the received signal in respective ones of the plurality of symbol positions. The second sequence of symbols includes known symbol values based on the first pass demodulating and decoding operations. Such operations are further illustrated in FIG. 9 at blocks 900–915 and in FIG. 10 blocks 1000 and 1015 as will be described further herein.

The partition circuit 570 partitions the sequence of symbols received by the receiver 510 into a plurality of subfields. Ones of the subfields include a plurality of the known symbol values with a sufficient number of known symbol values included in the subfields so as to determine a desired modulation type for use in demodulating the subfields based on the included plurality of known symbol values. A determination circuit 530 determines the desired demodulation type for use in demodulating the subfields based on the known symbol values of the respective ones of the subfields from the partition circuit 570. Also shown in FIG. 5, is an optional detector circuit 540 that detects an interferer signal characteristic discontinuity location in the sequence of symbols, which detected location, may be used, for example, in selecting the transition points between respective subfields.

The functionality of a receiver for the embodiments illustrated in FIGS. 1–5 may be implemented using discrete hardware components, a single application specific integrated circuit (ASIC), a programmed digital signal processor or microcontroller or combinations thereof referred to generally herein as a circuit or module. Moreover, FIGS. 1–5 illustrate exemplary architectures that may be used for processing a received signal in accordance with embodiments of the present invention. It will be understood that the present invention is not limited to these configurations, but is intended to encompass any configuration capable of carrying out the operations described herein regardless of how the functionality is grouped across different circuit devices or modules.

The present invention is described hereinafter with reference to flowchart and/or block diagram illustrations of methods, apparatus, and computer program products in accordance with exemplary embodiments of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 6:
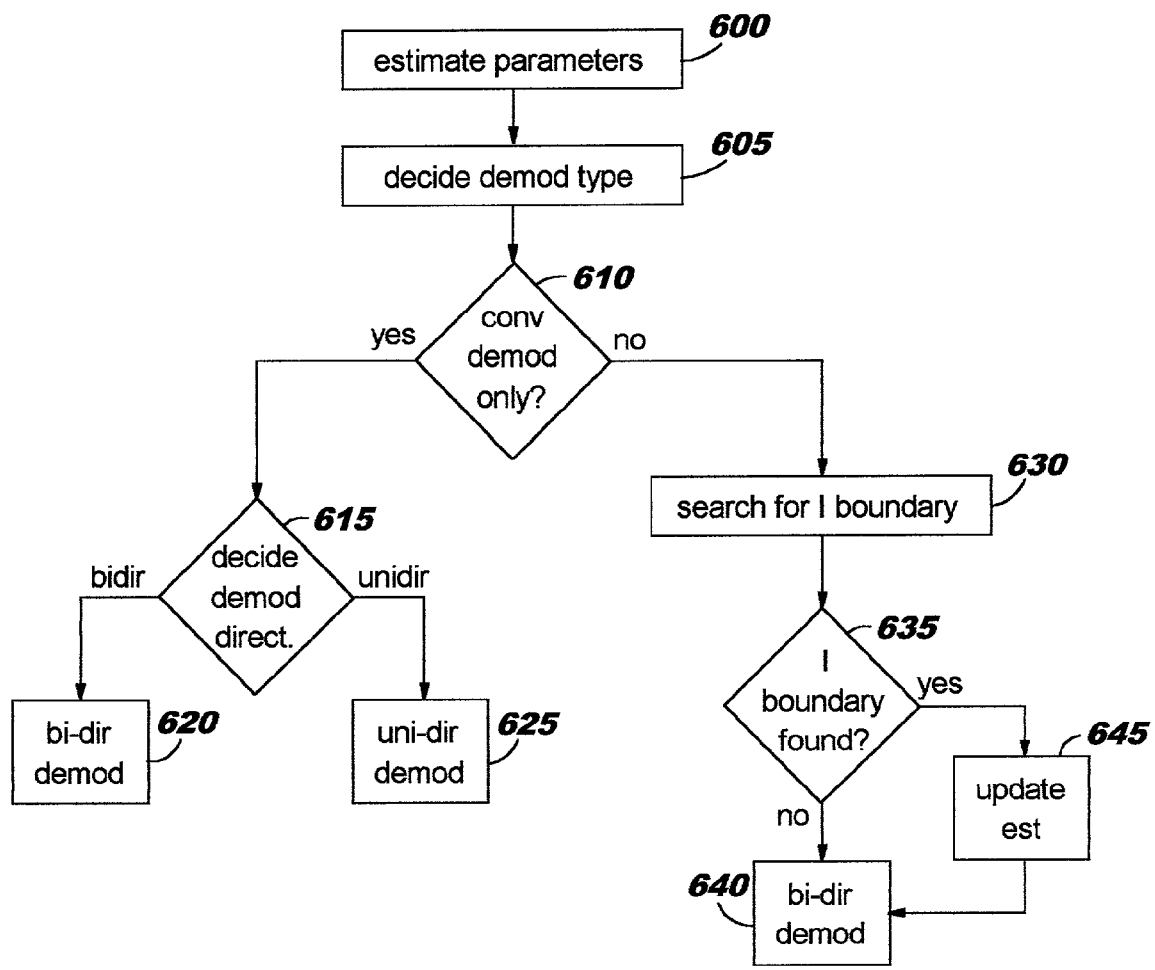
FIG. 6 is a flowchart illustration of operations related to processing a received signal for embodiments of the present invention having an unknown field between two known fields.

Referring now to the flowchart diagram of FIG. 6, operations begin at block 600 with the estimation of parameters associated with known fields of a received symbol sequence. The estimated parameters at block 600 may include C, N, C/(I+N), I/N or other such quantities. Using the parameter estimates from block 600, an initial decision is made as to which demodulation type should be performed at each unknown field/block (block 605). With reference to each adjacent pair of known fields/blocks, it is determined whether conventional demodulation has been selected for the unknown field with reference to both adjacent known fields (block 610). If so (block 610), it is determined whether to perform demodulation in one direction (uni-directional demodulation) or to demodulate starting from both known fields (bi-directional demodulation) (block 615). For example, uni-directional demodulation (block 625) may be selected if a difference between the estimated signal characteristics of the adjacent known blocks satisfies a difference criterion, such as where one of the known fields has a significantly better signal quality compared to the other known field. Where the difference between the estimated signal characteristics does not satisfy the difference criterion, bi-directional demodulation may be selected (block 620).

Bi-directional demodulation at block 620 may, for example, start from both known fields and proceed until midway through the unknown block between the known fields. Uni-directional demodulation at block 625 may start from the known field with a better signal quality and proceed until the other known field is reached. Thus, the direction of demodulation may be based on which of the known blocks has the better estimated signal characteristics.

Where conventional demodulation is not selected for both of the known blocks (block 610) in other words, where, for example, interference cancellation (joint demodulation) is chosen for at least one of the known blocks, this indicates that there may be an interferer present in at least one of the known blocks. In accordance with the present invention, it may then be desirable to determine whether there is a point in the unknown block of the slot between the two known fields where there is no longer any discernible interference present, for example, due to the beginning of a time misaligned interferer slot reflecting a change in the power of the interferer signal. Accordingly, an interferer signal characteristic discontinuity location in the unknown block is searched for and detected as an interferer boundary (block 630). By identifying interferer boundary or discontinuity locations, such as may be due to time-slot power control on the interferer transmission, it may be possible to improve demodulation across the unknown block.

Various approaches may be used to locate the interferer boundary in accordance with the present invention. For example, a first demodulation may be performed over the unknown data block and it may be determined from the residual error (from the demodulation metric) whether there is any abrupt change in I+N power over this portion of the slot. An alternative approach would be to search explicitly for any known sequences that might exist in the interferer data, such as synchronization or other sequences.

If an interferer boundary is detected (block 635), the location of any fields (symbols) in the interferer signal that can be used to improve estimation of interferer quantities which can be used for interferer cancellation (such as joint demodulation) are determined and these quantities are then estimated (block 645). Note, that these fields may have already been located by operations at block 630 as described above. If no interferer boundary is detected (block 635), bi-directional demodulation is utilized using the demodulation type chosen at each respective known field (block 640). Bi-directional demodulation at block 640 also proceeds where an interferer boundary is detected after estimation of the interferer parameters (block 640).

The bi-directional demodulation approach may proceed using the demodulation type selected at each respective known block until each technique reaches the identified interferer boundary when an interferer boundary is detected at block 635. Otherwise, if no interferer boundary is detected at block 635, the two demodulation approaches from each of the respective known blocks may proceed until they meet, for example, halfway through the unknown data block to be demodulated.

Figure 7:
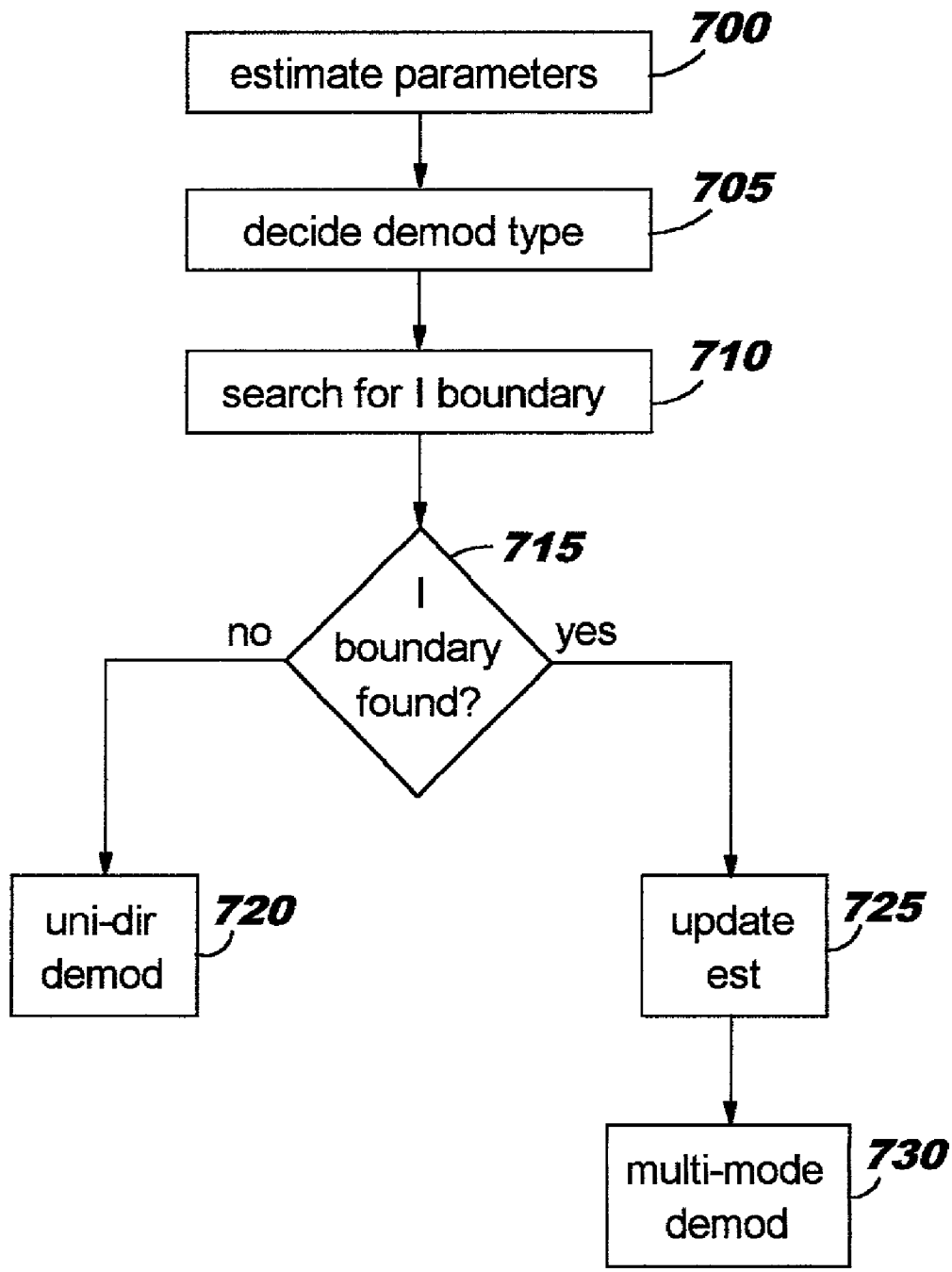
FIG. 7 is a flowchart illustration of operations related to processing a received signal for embodiments of the present invention having a single known field.

The operations described above with reference to FIG. 6 were described in the context of a signal having two adjacent known symbol blocks, such as illustrated in FIG. 2. Operations with reference to an environment with only one known field, such as illustrated in FIG. 3, will now be further described with reference to the flowchart illustration of FIG. 7. As shown in FIG. 7, operations begin at block 700 substantially as described with reference to block 600 of FIG. 6. Operations at block 705 similarly proceed substantially as described with reference to block 605 of FIG. 6. Similarly, operations at blocks 710 and 715 proceed in a manner substantially the same as described with reference to blocks 630 and 635 of FIG. 6.

If no interferer boundary is detected (block 715), uni-directional demodulation is utilized and proceeds from the known block until the end of the unknown data block using the chosen demodulation type for the known block (block 720). If an interferer boundary is detected (block 715), interferer characteristics estimates are updated at block 725, substantially as described with reference to block 645 of FIG. 6. Multi-mode demodulation is then performed (block 730).

Operations at block 730 may proceed by starting demodulation from the known block using the chosen demodulation type for the known block. Operations proceed using this type of demodulation across the unknown data block until the interferer boundary is reached. Once the interferer boundary is reached, the demodulation type for the unknown block may switch to the other demodulation type under consideration for the remainder of the unknown data. For example, where interferer cancellation demodulation is selected for the known block, such interferer cancellation demodulation may be used until the interferer boundary is reached and then conventional demodulation may be used for the remainder of the unknown data block. Such an approach is illustrated, for example, in FIG. 3.

Figure 8:
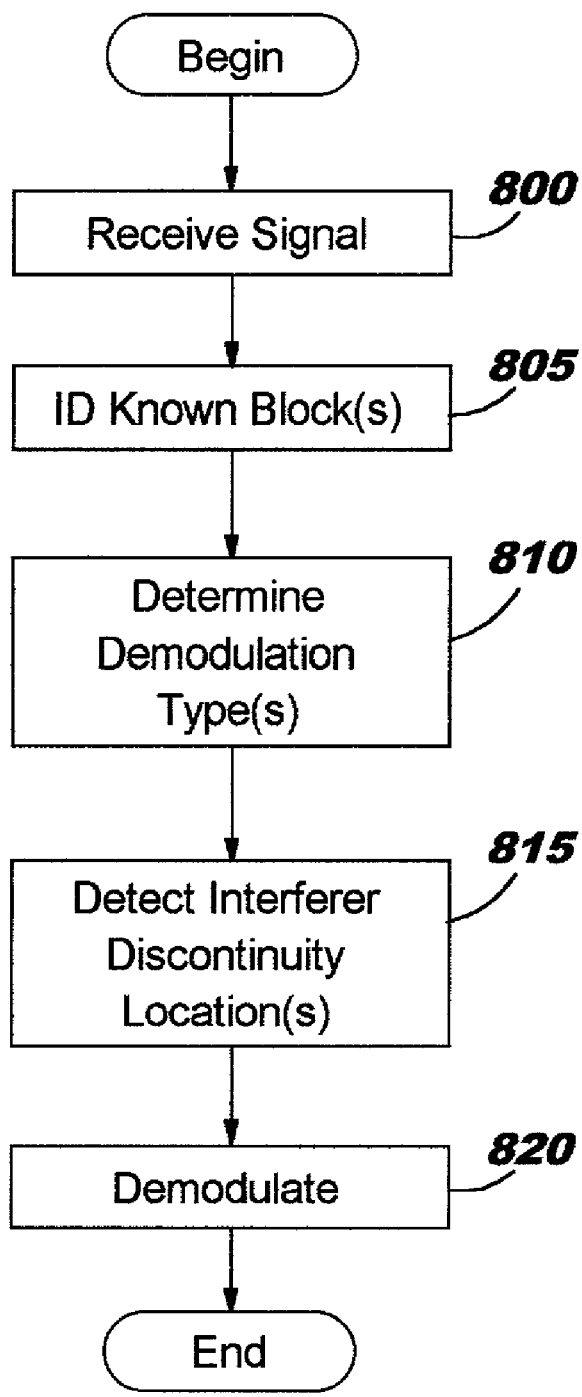
FIG. 8 is a flowchart illustration of operations related to processing a received signal for further embodiments of the present invention.

Operations for processing a received signal in accordance with further embodiments of the present invention will now be described with reference to the flowchart illustration of FIG. 8. Operations begin at block 800 by receiving a signal to provide a sequence of symbols associated with the received signal in respective ones of a plurality of symbol positions. A known block (or a plurality of known blocks) of the sequence of symbols containing known symbol values and an unknown block of the sequence of symbols containing unknown symbol values are identified (block 805). For example, two adjacent known blocks may be identified with the intervening unknown portion of the slot being identified as the unknown block such as illustrated for the desired signal (D) of FIG. 2.

A desired demodulation type is determined for use in demodulating an unknown block or blocks based on the known symbol values (block 810). An interferer signal characteristic discontinuity location in the unknown block is detected (block 815). For example, with reference to the illustration of FIG. 2, the interferer signal slot misalignment of the interferer signal (I) relative to the slot alignment of the desired signal component (D) of the received signal may be detected at block 815. The unknown block is demodulated using a first selected demodulation type between the interferer signal characteristic discontinuity and a known block and using a second selected demodulation type on another portion of the unknown block (block 820). The first selected demodulation type and the second selected demodulation type may be selected based on the determined desired demodulation type for use in demodulating the unknown block or blocks as well as based upon the detected interferer signal characteristic discontinuity. For example, with reference to FIG. 2, where the interferer is present in the known block 215 but not in the known block 210, operations at block 810 may include selecting interferer cancellation demodulation for block 215 and conventional (non-interferer cancellation) demodulation for block 210. Interferer cancellation or joint demodulation (JD) may then be used across the unknown block 220 up to the start point of the interferer signal 230. Conventional demodulation may then be used for the portion of the unknown block 220 up to the interferer signal characteristic discontinuity as shown in FIG. 2.

As described previously, operations at block 810 may include estimating interferer signal characteristics for the known blocks 210, 215 to determine whether non-interferer cancellation or interferer cancellation demodulation should be used based on the estimated interferer signal characteristics. Where an interferer is detected, an interferer cancellation demodulation may be selected for at least a portion of the received symbol sequence. Known interferer signal symbols may also be identified in the unknown block and the estimates of the interferer characteristics for use in interferer cancellation demodulation within the unknown block may be updated based on the identified known interferer signal symbols in the unknown block.

Operations have been described with reference to FIG. 8 in the context of a single interferer signal characteristic discontinuity in the unknown field. However, it is to be understood that a plurality of interferer signal characteristic discontinuities may be detected in the unknown block or a known block in accordance with the present invention. In such cases, a desired demodulation type may be selected to use between each of the detected interferer signal characteristic discontinuities based on the detected interferer signal characteristic discontinuities and the type of demodulation selected based on any known blocks.

Figure 9:
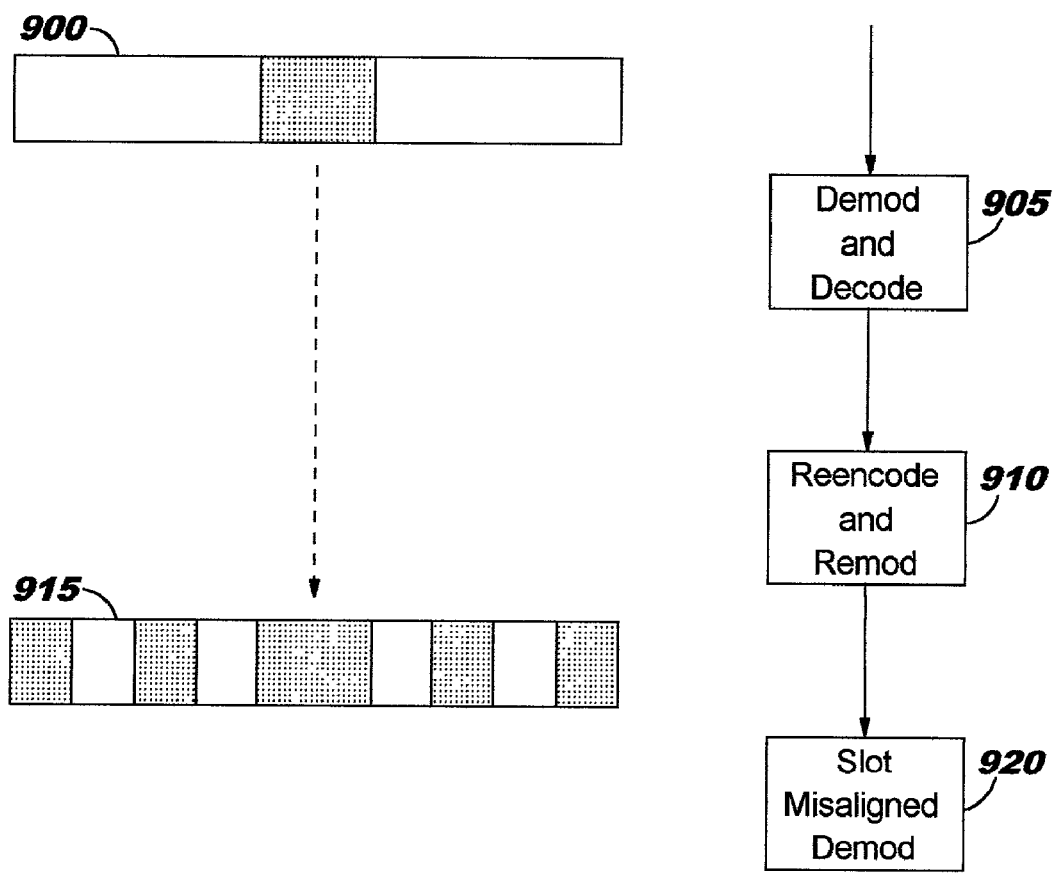
FIG. 9 is a schematic and flowchart illustration of operations related to processing a received signal using multi-pass demodulation according to further embodiments of the present invention.

Referring now to FIG. 9, operations related to multi-pass demodulation embodiments of the present invention will now be further described. As shown in FIG. 9, a sequence of symbols 900 with a single known field/block is received. The received sequence 900 is first pass demodulated and decoded to provide error corrected decoded bits (block 905). The error corrected decoded bits are then reencoded and modulated so as to provide a reconstructed transmitted signal to be provided as a second sequence of symbols associated with the received signal in respective ones of a plurality of symbol positions of the received symbol sequence (block 910). Note that, in systems where there are different classes of transmitted data (e.g., a coded class and an uncoded class), this may desirably result in the reconstructed transmitted data containing known fields interspersed throughout the slot. This is illustrated by the exemplary slot 915 of FIG. 9. The reencoded and remodulated symbol estimates may then be used to define one or more known blocks of the sequence of symbols containing known symbol values with intervening unknown blocks of data, the combination of which may be processed as described previously with reference to FIGS. 6–8. For example, the reconstructed known fields as shown at slot 915 of FIG. 9 can be designated/selected/partitioned into a plurality of subfields based on detected interferer signal characteristic discontinuity locations so as to position the detected interferer signal characteristic discontinuity locations at transitions between ones of the partitioned subfields. Each known pilot field may then be used to make a decision on whether to perform conventional demodulation or interference cancellation (joint) demodulation. The subfields can then be demodulated (block 920).

Figure 10:
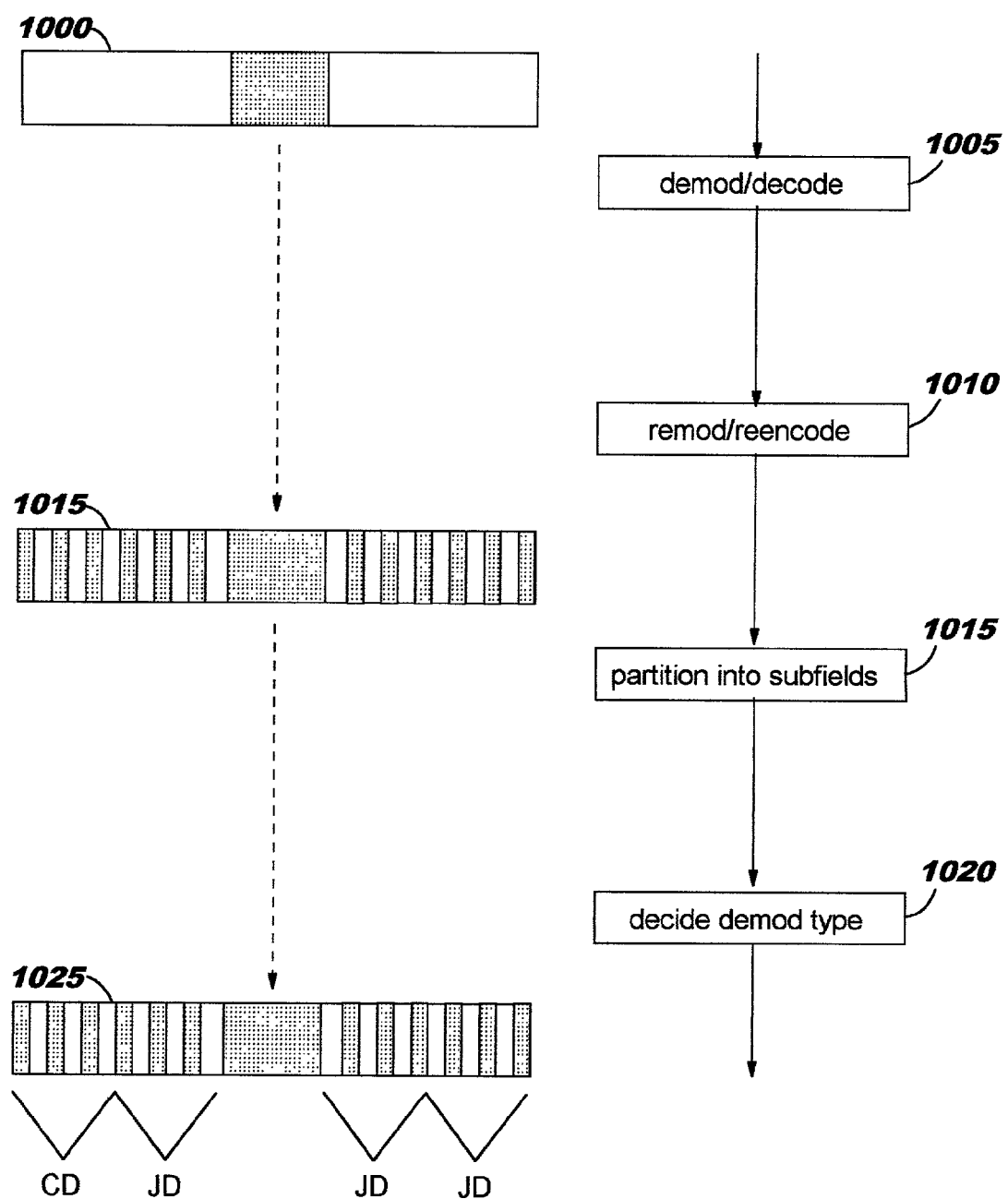
FIG. 10 is a schematic and flowchart illustration of operations related to processing a received signal using multi-pass demodulation according to other embodiments of the present invention.

Referring now to the flowchart/schematic diagram of FIG. 10, operations related to alternative embodiments of the present invention utilizing multi-pass demodulation, where, after remodulation the reconstructed known pilot fields are not large enough to make a good decision about which demodulation type to use, will be further described. Note that, for the embodiments illustrated in FIG. 10, the aspects related to detection of an interferer boundary location as described previously with reference to FIGS. 6–9 need not be utilized.

As shown in FIG. 10, an original slot including a sequence of symbols 1000 having a single known field is received. The received slot 1000 is demodulated and decoded (block 1005) and then reencoded and remodulated (block 1010) in a manner substantially as described with reference to blocks 905 and 910 of FIG. 9 to provide a second sequence of symbols 1015 including interspersed known symbols. The approach utilized in FIG. 10, however, is to divide the portion of the unknown data that contains the pilot (or known) symbols into an arbitrary number of subfields. The objective of this partitioning is to have each subfield contain sufficient pilot (known) information that estimates of the appropriate quantities for choosing conventional demodulation or interference cancellation can be made and each demodulation type can be evaluated for each subfield. Thus, subfields are defined (block 1015) and a demodulation type for use in a selected subfield is determined (block 1020).

In this approach, any known interferer fields can be estimated for use with the interference cancellation approaches. For each subfield, a decision about which demodulation type to use is made and, optionally, for specific subfields, the boundary between interferer slots can be detected (as described previously) so as to use different demodulation techniques to improve demodulation performance within the subfield. However, such detection of the interferer discontinuity locations may not be used, particularly as the impact on performance of having an interferer boundary within a block can be minimized by choosing small subfields so that any poor performance of a specific individual subfield may be minimized. Alternatively, if an interferer boundary is detected, the definition of the subfields at block 1015 may be altered so that a subfield boundary is aligned with the interferer boundary to further minimize any associated loss or performance. Thus, as illustrated by the slot grouping 1025 and the associated designation of conventional demodulation (CD) or joint demodulation (JD), the selected intervals (subfields) for the different modulation types may include a plurality of known/pilot field symbols interspersed among other unknown symbols. As shown at slot 1025 of FIG. 10, three pilot (known) sequences are included in each subfield and then each subfield has a selected demodulation type, shown as conventional demodulation (CD) for the first subfield in slot 1025 and joint demodulation (JD) for the other subfields.

Figure 11:
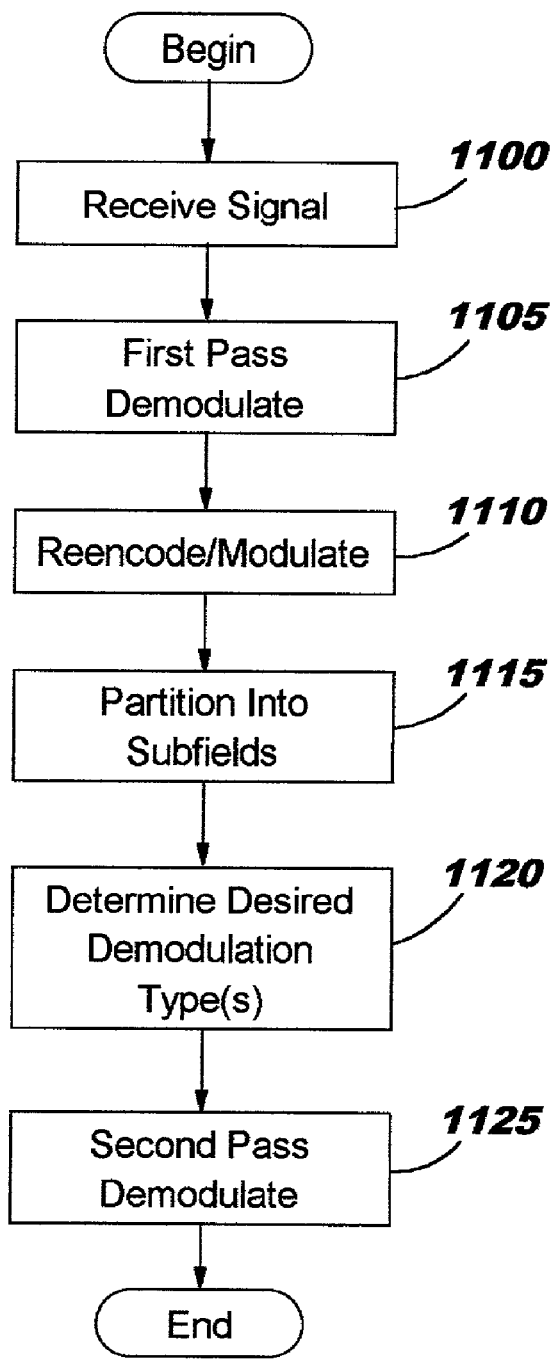
FIG. 11 is a flowchart illustration of operations related to processing a received signal using multi-pass demodulation according to further embodiments of the present invention.

Referring now to the flowchart illustration of FIG. 11, further embodiments of the present invention utilizing multipass demodulation will be described. Operations begin at block 1100 with receipt of a signal to provide a sequence of signals associated with the received signal in respective ones of a plurality of symbol positions. The received sequence of symbols is first pass demodulated and decoded to provide error corrected decoded bits (block 1105). The error corrected decoded bits are reencoded and modulated to provide a second sequence of symbols associated with the received signal in respective ones of the plurality of symbol positions (block 1110). The second sequence of symbols includes known symbol values based on the first pass demodulating and decoding operations at block 1105.

The sequence of symbols is partitioned into a plurality of subfields with ones of the subfields including a plurality of known symbol values (block 1115). As described previously with reference to FIG. 10, the subfield partitioning is selected so as to include a plurality of known symbol values selected to be sufficient to allow determination of a desired demodulation type for use in demodulating the subfields based on the known symbol values included in the subfield. The desired demodulation type for use in demodulating the respective subfields is then determined based on the plurality of known symbol values contained in respective ones of the subfields (block 1120). The subfields are then second pass demodulated using the respective determined demodulation types for the subfields (block 1125). Alternatively, an interferer signal characteristic discontinuity location within a subfield may be detected and a first desired demodulation type may be used for a first portion of one of the subfields and a second desired demodulation type may be used for a second portion of the subfield with the first portion and the second portion being demarcated by the interferer signal characteristic discontinuity location within the subfield.

As described above for various embodiments of the present invention disclosed herein, signal reception according to the present invention may be beneficial in interference limited environments for systems which contain time slots. Examples of such systems include IS-136, Global System for Mobile Communications (GSM) and Enhanced Data Rates for Global Evolution (EDGE). For example, interference cancellation receivers are typically used for IS-136 with interference rejection combining for the uplink and joint demodulation proposed for use in the downlink. The methods and systems of the present invention may be beneficially applied to both uplink and downlink communications in such an environment. Note that, while detection and estimation of interferer quantities has been generally discussed herein, the present invention is not limited to any particular method of estimating interferer quantities for use in joint demodulation. Methods to estimate a residual signal (noise and interference) power after conventional equalization are described, for example, in U.S. patent application Ser. No. 09/814,889 entitled "Communication System and Method for Measuring Short-Term and Long-Term Channel Characteristics."Further approaches to detecting quantities related to an interferer are described in U.S. patent application Ser. No. 09/747,344 entitled "Improving Channel Estimation via Joint Demodulation via Known Field Location" which is related to estimating the location of fixed fields using detected interferer bits and in U.S. patent application Ser. No. 09/464,830 filed Dec. 17, 1999 and entitled "Selective Joint Demodulation Systems and Methods for Receiving a Signal in the Presence of Noise and Interference" which seeks to find interferer sync positions through correlation, the entirety of which disclosures is incorporated herein by reference as if set forth in their entirety.

The flowcharts of FIGS. 6–11 show the architecture, functionality, and operation of exemplary embodiments of methods, communication apparatus, and computer program products for processing a received signal. In this regard, each block may represent a module, segment, or portion of code, which comprises one or more executable instructions for implementing the specified logical function(s). It should also be noted that, in some embodiments, the functions noted in the blocks may occur out of the order noted in FIGS. 6–11. For example, two blocks shown in succession in FIGS. 6–11 may be executed substantially concurrently or the blocks may sometimes be executed in the reverse order, depending upon the functionality involved.

It should be noted that many variations and modifications can be made to the preferred embodiments described above without substantially departing from the principles of the present invention. All such variations and modifications are intended to be included herein within the scope of the present invention, as set forth in the following claims.

I claim:

1. A method of processing a received signal, comprising:
   receiving the signal to provide a sequence of symbols associated with the received signal in respective ones of a plurality of symbol positions;
   identifying a known block of the sequence of symbols containing known symbol values and an unknown block of the sequence of symbols containing unknown symbol values;
   determining a desired demodulation type for use in demodulating the unknown block based on the known symbol values including estimating interferer signal characteristics for the known block and selecting either non-interferer cancellation or interferer cancellation demodulation as the desired demodulation type for use in demodulating the unknown block based on the estimated interferer signal characteristics;

detecting an interferer signal characteristic discontinuity location in the unknown block; and demodulating the unknown block using a first selected demodulation type on a first portion of the unknown block and a second, different selected demodulation type on another portion of the unknown block, the first selected demodulation type and the second selected demodulation type being selected based on the determined desired demodulation type for use in demodulating the unknown block and the detected interferer signal characteristic discontinuity;

wherein interferer cancellation demodulation is selected for either the first selected demodulation type or the second selected modulation type and wherein demodulating the unknown block using a first selected demodulation type on a first portion of the unknown block and a second, different selected demodulation type on another portion of the unknown block further comprises:

identifying known interferer signal symbols in the unknown block; and updating estimates of interferer signal characteristics for use in interferer cancellation demodulation of at least a portion of the unknown block based on the identified known interferer signal symbols.

2. The method of claim 1 wherein the interferer signal characteristic discontinuity comprises an interferer signal slot misalignment relative to a slot alignment of a desired signal component of the received signal.

3. A method of processing a received signal, comprising:
receiving the signal to provide a sequence of symbols associated with the received signal in respective ones of a plurality of symbol positions;

identifying a known block of the sequence of symbols containing known symbol values and an unknown block of the sequence of symbols containing unknown symbol values;

determining a desired demodulation type for use in demodulating the unknown block based on the known symbol values including estimating interferer signal characteristics for the known block and selecting either non-interferer cancellation or interferer cancellation demodulation as the desired demodulation type for use in demodulating the unknown block based on the estimated interferer signal characteristics;

detecting an interferer signal characteristic discontinuity location in the unknown block;

demodulating the unknown block using a first selected demodulation type on a first portion of the unknown block and a second selected demodulation type on another portion of the unknown block, the first selected demodulation type and the second selected demodulation type being selected based on the determined desired demodulation type for use in demodulating the unknown block and the detected interferer signal characteristic discontinuity;

identifying a second known block of the sequence of symbols containing known symbol values, the another portion of the unknown block being between the interferer signal characteristic discontinuity and the second known block;

determining a desired demodulation type for use in demodulating the another portion of the unknown block based on the known symbol values contained in the second known block by estimating interferer signal characteristics for the second known block and selecting either non-interferer cancellation or interferer cancellation demodulation based on the estimated interferer signal characteristics for the another portion of the unknown block;

wherein demodulating the unknown block using a first selected demodulation type on a first portion of the unknown block and a second selected demodulation type on another portion of the unknown block comprises:

selecting the desired demodulation type for use in demodulating the unknown block as the first selected demodulation type and the desired demodulation type for use in demodulating the another portion of the unknown block as the second selected demodulation type; and bi-directional demodulating the unknown block if either the first selected demodulation type or the second selected demodulation type is interferer cancellation demodulation.

4. The method of claim 3 wherein demodulating the unknown block using a first selected demodulation type between the interferer signal characteristic discontinuity and the known block and a second selected demodulation type on another portion of the unknown block further comprises selecting either uni-directional demodulation or bi-directional demodulation for the unknown block based on a signal characteristic of the first known block and a signal characteristic of the second known block if the first selected demodulation type and the second selected demodulation type are non-interferer cancellation demodulation.

5. The method of claim 4 wherein selecting either uni-directional demodulation or bi-directional demodulation for the unknown block based on a signal characteristic of the first known block and a signal characteristic of the second known block if the first selected demodulation type and the second selected demodulation type are non-interferer cancellation demodulation comprises:

selecting uni-directional demodulation if a difference between the signal characteristics of the known blocks satisfies a difference criterion; and selecting bi-directional demodulation if the difference does not satisfy the difference criterion.

6. The method of claim 5 wherein identifying a known block of the sequence of symbols containing known symbol values and identifying a second known block further comprises:

first pass demodulating and decoding the sequence of symbols to provide error corrected decoded bits;

recoding and modulating the error corrected decoded bits to provide a second sequence of symbols associated with the received signal in respective ones of the plurality of symbol positions; and identifying ones of the re-encoded and modulated error corrected decoded bits as the first and second known block of the sequence of symbols containing known symbol values.

7. The method of claim 1 wherein the estimated interferer characteristics include at least one characteristic selected from the group consisting of desired signal carrier power, noise power, interference, signal power or a ratio calculated based on ones of desired signal carrier power, noise power, interference and signal power.

8. The method of claim 1 wherein a plurality of interferer signal characteristic discontinuities are detected in the unknown block and wherein demodulating the unknown block using a first selected demodulation type between the interferer signal characteristic discontinuity and the known block and a second selected demodulation type on another portion of the unknown block further comprises selecting a desired demodulation type to use between each of the detected interferer signal characteristic discontinuities based on the detected interferer signal characteristic discontinuities.

9. A method of processing a received signal, comprising:
receiving the signal to provide a sequence of symbols associatedwith the received signal in respective ones of a plurality of symbol positions;
identifying a known block of the sequence of symbols containing known symbol values and an unknown block of the sequence of symbols containing unknown symbol values;
determining a desired demodulation type for use in demodulating the unknown block based on the known symbol values including estimating interferer signal characteristics for the known block and selecting either non-interferer cancellation or interferer cancellation demodulation as the desired demodulation type for use in demodulating the unknown block based on the estimated interferer signal characteristics;
detecting an interferer signal characteristic discontinuity location in the unknown block; and
demodulating the unknown block using a first selected demodulation type on a first portion of the unknown block and a second selected demodulation type on another portion of the unknown block, the first selected demodulation type and the second selected demodulation type being selected based on the determined desired demodulation type for use in demodulating the unknown block and the detected interferer signal characteristic discontinuity;
wherein identifying a known block of the sequence of symbols containing known symbol values further comprises:
first pass demodulating and decoding the sequence of symbols to provide error corrected decoded bits;
recoding and modulating the error corrected decoded bits to provide a second sequence of symbols associated with the received signal in respective ones of the plurality of symbol positions; and
identifying ones of the re-encoded and modulated error corrected decoded bits as at least one known block of the sequence of symbols containing known symbol values.

10. A method of processing a received signal comprising:
receiving the signal to provide a sequence of symbols associated with the received signal in respective ones of a plurality of symbol positions;
first pass demodulating and decoding the sequence of symbols to provide error corrected decoded bits;
recoding and modulating the error corrected decoded bits to provide a second sequence of symbols associated with the received signal in respective ones of the plurality of symbol positions, the second sequence of symbols including known symbol values based on the first pass demodulating and decoding;
partitioning the second sequence of symbols into a plurality of subfields, ones of the subfields including a plurality of the known symbol values selected to determine a desired demodulation type for use in demodulating the subfields based on the plurality of known symbol values;
determining the desired demodulation types for use in demodulating the subfields based on the plurality of known symbol values of the respective ones of the subfields; and
demodulating the subfields using the respective determined desired demodulation types.

11. The method of claim 10 wherein determining the desired demodulation type for use in demodulating the subfields further comprises selecting either non-interferer cancellation or interferer cancellation demodulation as the desired demodulation type for use in demodulating the subfields.

12. The method of claim 11 wherein determining a desired demodulation type for use in demodulating the subfields further comprises estimating interferer signal characteristics for the ones of the subfields and selecting either non-interferer cancellation or interferer cancellation demodulation based on the estimated interferer signal characteristics.

13. The method of claim 12 further comprising detecting an interferer signal characteristic discontinuity location in the sequence of symbols.

14. The method of claim 13 wherein partitioning the sequence of symbols into a plurality of subfields further comprises partitioning the sequence of symbols into a plurality of subfields based on the detected interferer signal characteristic discontinuity location to position the detected interferer signal characteristic discontinuity location at a transition between ones of the subfields.

15. The method of claim 13 wherein the interferer signal characteristic discontinuity location is in an identified one of the subfields and wherein determining the desired demodulation type for use in demodulating the subfields further comprises determining a first desired demodulation type for a first portion of the identified one of the subfields and a second desired demodulation type for a second portion of the identified one of the subfields, the first portion and the second portion being demarcated by the interferer signal characteristic discontinuity location.

16. A system for processing a received signal comprising:
a receiver that receives the signal to provide a sequence of symbols associated with the received signal in respective ones of a plurality of symbol positions;
an identification circuit that identifies a known block of the sequence of symbols containing known symbol values and an unknown block of the sequence of symbols containing unknown symbol values;
a determination circuit that determines a desired demodulation type for use in demodulating the unknown block based on the known symbol values;
a detector circuit that detects an interferer signal characteristic discontinuity location in the unknown block; and
a demodulator that demodulates the unknown block using a first selected demodulation type on a first portion of the unknown block and a second selected demodulation type on another portion of the unknown block, the first selected demodulation type and the second selected demodulation type being selected based on the determined desired demodulation type for use in demodulating the unknown block and the detected interferer signal characteristic discontinuity;
wherein the determination circuit is further configured to estimate interferer signal characteristics for the known block and selects the desired demodulation type based on the estimated interferer signal characteristics;
wherein the interferer signal characteristic discontinuity comprises an interferer signal slot misalignment relative to a slot alignment of a desired signal component of the received signal; and wherein the demodulator is configured to perform a selected one of uni-directional demodulation or bi-directional demodulation.

17. The system of claim 16 wherein the demodulator further comprises a multi-pass demodulator and wherein the identification circuit is configured to identify the known block based on symbol estimates generated by a first pass demodulation of the sequence of bits by the multi-pass demodulator.

18. The system of claim 16 wherein the system comprises a mobile terminal.

19. The system of claim 16 wherein the system comprises a base station transceiver.

20. A system for processing a received signal comprising:
a receiver that receives the signal to provide a sequence of symbols associated with the received signal in respective ones of a plurality of symbol positions;
a first pass demodulator/decoder that first pass demodulates and decodes the sequence of symbols to provide error corrected decoded bits;
a re-encoder circuit that recodes and modulates the error corrected decoded bits to provide a second sequence of symbols associated with the received signal in respective ones of the plurality of symbol positions, the second sequence of symbols including known symbol values based on the first pass demodulating and decoding;
a partition circuit that partitions the second sequence of symbols into a plurality of subfields, ones of the subfields including a plurality of the known symbol values selected to determine a desired demodulation type for use in demodulating the subfields based on the plurality of known symbol values;
a determination circuit that determines the desired demodulation types for use in demodulating the subfields based on the plurality of known symbol values of the respective ones of the subfields; and
a second pass demodulator that demodulates the subfields using the respective determined desired demodulation types.

21. The system of claim 20 wherein the first pass demodulator and the second pass demodulator comprise a multi-pass demodulator.

22. The system of claim 20 wherein the desired demodulation type is selected from the group consisting of non-interferer cancellation and interferer cancellation.

23. The system of claim 22 wherein the system further comprises a detector circuit that detects an interferer signal characteristic discontinuity location in the sequence of symbols.

24. The system of claim 23 wherein the partition circuit partitions the sequence of symbols into a plurality of subfields so as to position a detected interferer signal characteristic discontinuity location at a transition between ones of the subfields.

25. The system of claim 20 wherein the system comprises a mobile terminal.

26. The system of claim 20 wherein the system comprises a base station transceiver.

27. A system for processing a received signal, comprising:
means for receiving the signal to provide a sequence of symbols associated with the received signal in respective ones of a plurality of symbol positions;
means for identifying a known block of the sequence of symbols containing known symbol values and an unknown block of the sequence of symbols containing unknown symbol values;
means for determining a desired demodulation type for use in demodulating the unknown block based on the known symbol values including means for estimating interferer signal characteristics for the known block and selecting either non-interferer cancellation or interferer cancellation demodulation as the desired demodulation type for use in demodulating the unknown block based on the estimated interferer signal characteristics;
means for detecting an interferer signal characteristic discontinuity location in the unknown block; and
means for demodulating the unknown block using a first selected demodulation type on a first portion of the unknown block and a second, different selected demodulation type on another portion of the unknown block, the first selected demodulation type and the second selected demodulation type being selected based on the determined desired demodulation type for use in demodulating the unknown block and the detected interferer signal characteristic discontinuity;
wherein interferer cancellation demodulation is selected for either the first selected demodulation type or the second selected modulation type and wherein the means for demodulating the unknown block using a first selected demodulation type on a first portion of the unknown block and a second, different selected demodulation type on another portion of the unknown block further comprises:
means for identifying known interferer signal symbols in the unknown block; and
means for updating estimates of interferer signal characteristics for use in interferer cancellation demodulation of at least a portion of the unknown block based on the identified known interferer signal symbols.

28. The system of claim 27 wherein the interferer signal characteristic discontinuity comprises an interferer signal slot misalignment relative to a slot alignment of a desired signal component of the received signal.

29. A system for processing a received signal, comprising:
means for receiving the signal to provide a sequence of symbols associated with the received signal in respective ones of a plurality of symbol positions;
means for identifying a known block of the sequence of symbols containing known symbol values and an unknown block of the sequence of symbols containing unknown symbol values;
means for determining a desired demodulation type for use in demodulating the unknown block based on the known symbol values including means for estimating interferer signal characteristics for the known block and selecting either non-interferer cancellation or interferer cancellation demodulation as the desired demodulation type for use in demodulating the unknown block based on the estimated interferer signal characteristics;
means for detecting an interferer signal characteristic discontinuity location in the unknown block; and
means for demodulating the unknown block using a first selected demodulation type on a first portion of the unknown block and a second selected demodulation type on another portion of the unknown block, the first selected demodulation type and the second selected demodulation type being selected based on the determined desired demodulation type for use in demodulating the unknown block and the detected interferer signal characteristic discontinuity;
means for identifying a second known block of the sequence of symbols containing known symbol values, the another portion of the unknown block being between the interferer signal characteristic discontinuity and the second known block;
means for determining a desired demodulation type for use in demodulating the another portion of the unknown block based on the known symbol values contained in the second known block by estimating interferer signal characteristics for the second known block and selecting either non-interferer cancellation or interferer cancellation demodulation based on the estimated interferer signal characteristics for the second known block;
wherein the means for demodulating the unknown block using a first selected demodulation type on a first portion of the unknown block and a second selected demodulation type on another portion of the unknown block comprises:
means for selecting the desired demodulation type for use in demodulating the unknown block as the first selected demodulation type and the desired demodulation type for use in demodulating the another portion of the unknown block as the second selected demodulation type; and
means for bi-directional demodulating the unknown block if either the first selected demodulation type or the second selected demodulation type is interferer cancellation demodulation.

30. The system of claim 29 wherein the means for demodulating the unknown block using a first selected demodulation type between the interferer signal characteristic discontinuity and the known block and a second selected demodulation type on another portion of the unknown block further comprises means for selecting either uni-directional demodulation or bi-directional demodulation for the unknown block based on a signal characteristic of the first known block and a signal characteristic of the second known block if the first selected demodulation type and the second selected demodulation type are non-interferer cancellation demodulation.

31. The system of claim 30 wherein the means for selecting either uni-directional demodulation or bi-directional demodulation for the unknown block based on a signal characteristic of the first known block and a signal characteristic of the second known block if the first selected demodulation type and the second selected demodulation type are non-interferer cancellation demodulation comprises:
means for selecting uni-directional demodulation if a difference between the signal characteristics of the known blocks satisfies a difference criterion; and
means for selecting bi-directional demodulation if the difference does not satisfy the difference criterion.

32. The system of claim 31 wherein the means for identifying a known block of the sequence of symbols containing known symbol values and identifying a second known block further comprises:
means for first pass demodulating and decoding the sequence of symbols to provide error corrected decoded bits;
means for recoding and modulating the error corrected decoded bits to provide a second sequence of symbols associated with the received signal in respective ones of the plurality of symbol positions; and means for identifying ones of the re-encoded and modulated error corrected decoded bits as the first and second known block of the sequence of symbols containing known symbol values.

33. A system for processing a received signal comprising:
means for receiving the signal to provide a sequence of symbols associated with the received signal in respective ones of a plurality of symbol positions;
means for first pass demodulating and decoding the sequence of symbols to provide error corrected decoded bits;
means for recoding and modulating the error corrected decode bits to provide a second sequence of symbols associated with the received signal in respective ones of the plurality of symbol positions, the second sequence of symbols including known symbol values based on the first pass demodulating and decoding;
means for partitioning the second sequence of symbols into a plurality of subfields, ones of the subfields including a plurality of the known symbol values selected to determine a desired demodulation type for use in demodulating the subfields based on the plurality of known symbol values;
means for determining the desired demodulation types for use in demodulating the subfields based on the plurality of known symbol values of the respective ones of the subfields; and
means for demodulating the subfields using the respective determined desired demodulation types.

34. The system of claim 33 wherein the means for determining the desired demodulation type for use in demodulating the subfields further comprises means for selecting either non-interferer cancellation or interferer cancellation demodulation as the desired demodulation type for use in demodulating the subfields.

35. The system of claim 34 wherein the means for determining a desired demodulation type for use in demodulating the subfields further comprises means for estimating interferer signal characteristics for the ones of the subfields and selecting either non-interferer cancellation or interferer cancellation demodulation based on the estimated interferer signal characteristics.

36. The system of claim 35 further comprising means for detecting an interferer signal characteristic discontinuity location in the sequence of symbols.

37. The system of claim 36 wherein the means for partitioning the sequence of symbols into a plurality of subfields further comprises means for partitioning the sequence of symbols into a plurality of subfields based on the detected interferer signal characteristic discontinuity location to position the detected interferer signal characteristic discontinuity location at a transition between ones of the subfields.

38. The system of claim 37 wherein the means for determining a desired demodulation type for use in demodulating the subfields further comprises means for estimating interferer signal characteristics for the ones of the subfields and selecting either non-interferer cancellation or interferer cancellation demodulation based on the estimated interferer signal characteristics.

* * * * *